United States Patent [19]
Jardinier et al.

[11] Patent Number: 5,234,481
[45] Date of Patent: Aug. 10, 1993

[54] FILTRATION AND PRESSURE STABILIZATION DEVICE FOR VARIABLE-FLOW VENTILATION SYSTEM

[75] Inventors: Pierre C. J. Jardinier, Gournay S/Marne; Jacques Simonnot, Lesigny, both of France

[73] Assignee: Societe d'Etude et de Recherche en Ventilation et Aeraulique Serva, ZA, Saint Georges, France

[21] Appl. No.: 773,945

[22] PCT Filed: Mar. 26, 1991

[86] PCT No.: PCT/FR91/00241
§ 371 Date: Dec. 19, 1991
§ 102(e) Date: Dec. 19, 1991

[87] PCT Pub. No.: WO91/14903
PCT Pub. Date: Oct. 3, 1991

[30] Foreign Application Priority Data
Mar. 26, 1990 [FR] France .................... 9004279

[51] Int. Cl.⁵ ............................. B01D 46/00
[52] U.S. Cl. ............................. 95/19; 55/352; 95/273
[58] Field of Search ........... 55/351, 352, 354, 97

[56] References Cited
U.S. PATENT DOCUMENTS 3,332,215  7/1967  Revell .................... 55/352
3,985,528  10/1976 Revell .................... 55/352

FOREIGN PATENT DOCUMENTS 2338048  2/1975  Fed. Rep. of Germany .
494181   3/1976  U.S.S.R. ................. 55/352

*Primary Examiner*—Bernard Nozick
*Attorney, Agent, or Firm*—Oliff & Berridge

[57] ABSTRACT

A device for a variable-flow ventilation system has a filter (10) associated with a ventilation air intake and a shutter element (12) made of an impermeable material, designed to be applied against filter (10) to cover it wholly or partially. The shutter is associated with a mechanism for controlling shutter movement which is connected to a computer (18) which receives information constituted by the pressure value or flow value at the outlet from the fan housing (2). Depending on the information supplied to the computer, the computer acts to hold the pressure at a constant value by affecting the position of the shutter relative to the filter and/or causing the filter to advance.

19 Claims, 4 Drawing Sheets

FILTRATION AND PRESSURE STABILIZATION DEVICE FOR VARIABLE-FLOW VENTILATION SYSTEM

BACKGROUND

The present invention relates to a filtration and pressure stabilization device for a variable-flow ventilation system.

It is known that ventilation systems can be made to have a variable flow, either to provide heat loads with a variable value, or to modify the flow as a function of the needs of the premises to be ventilated. It is also known, particularly in office buildings or industrial buildings, that forced-air ventilation can be provided, allowing the flow to be controlled in each room. It is advantageous to have a filter ahead of the fan, which can purify the air blown into the various rooms.

It should be noted that the filter introduces variations in the value of the pressure available hence variations in the value of the flow, which affects the desired flow.

A first solution in maintaining the desired flow consists of regularly cleaning the filters. However, this cleaning is an expensive maintenance operation and does not fully stabilize the pressure, since even if the filter is replaced before it is completely clogged, the value of the pressure available will vary depending on how much dirt the filter has accumulated.

There are also roll-type filters, namely filters with a greater length than the length of the air inlet opening with which the filter is associated, this roll-type filter cooperating with a supply roller and a takeup roller which are driven synchronously at regular time intervals.

Other than the fact that the roll-type filter does not ensure full pressure stabilization, it requires frequent replacement to prevent clogging which results in a high operating cost.

German Patent DE-A-2,338,048 relates to a device having a roll-type filter with which a variable-position shutter is associated. The goal of this device is to neutralize a useful part of the filter when the ventilation flow decreases. Thus, the idea is automatically to adjust the filter surface area to variations in flow, without taking into account the dirtiness of this filter surface. Thus, when the flow is far from the maximum capacity of the filtration device, and the exposed filter surface offers too much air resistance because it is dirty, the filter is replaced instead of exposing a larger filter surface. Thus, this control method affords no filter economies whatever.

SUMMARY OF THE INVENTION

The goal of the invention is to furnish a device able to stabilize pressure, taking into account both the air flow and the filter dirtiness with a view to benefiting from totally regular pressure conditions, while using each filter to the maximum of its capacity, i.e. allowing it to be clogged completely, which saves on filter material costs.

For this purpose, the device according to the invention is associated with an air inlet opening in a fan housing and to a traveling filter equipped with means allowing the useful part of the filter located opposite the air passage opening to be renewed, and a shutter element, made of impermeable material, designed to be applied against the filter and cover it wholly or partially. The shutter associated with means for controlling its movement. The movement control means is connected to a computer which receives information from a sensor located in the fluid stream and is characterized by the sensor measuring the fluid pressure or flow at the outlet of the fan housing. The computer is designed such that pressure stabilization is effected first by changing the position of the shutter then, when the shutter is in the "filter fully exposed" position, by acting on its control means to renew the filter, at least partially.

In practice, when the filter is new and the flow is weak, the shutter covers most of the filter. When the filter is dirty or when the flow increases, the shutter exposes a larger filter surface area to keep the pressure constant. As the filter becomes dirtier, more and more of it is uncovered by the shutter. When the filter is totally uncovered by the shutter, and the pressure value is less than the setpoint, the computer causes part of the filter to be replaced. The degree of replacement can vary according to the flowrate requested, and the shutter can then cover the filter again to a greater or lesser degree depending on how dirty the filter is and the required flowrate.

Other than the fact that this device stabilizes the pressure, it also increases the filtration potential since the filter is not systematically renewed regardless of its dirtiness, but only when it is completely clogged. This results in a longer service life for a filter with a given surface area, and hence in less maintenance than usual.

According to another characteristic of the invention, the computer is associated with a timing mechanism which does not take the measured pressure value into account until a certain period of time has elapsed, ensuring that a stabilized pressure value is taken into account.

Advantageously, the filter advance control means are associated with means of measuring the value of this advance; these measuring means react and activate an alarm system if, once a given length of filter has been replaced, the pressure has still not stabilized. Such a case occurs only with an operating failure, or if too large a flow is called for, for example if part of the system is disconnected.

In such a case, the computer logic causes regulation to stop, and a new regulation process begins only when the pressure in the system is reestablished. This provision prevents too great an area of clean filter from being pointlessly paid out in the event of an incident.

According to a first embodiment of this device, the filter is a roll-type traveling filter, and is associated with a rotationally braked supply roller and a motorized takeup roller.

The shutter itself is composed of a windable/unwindable sheet of fluidtight material, associated with a motorized roller, and with a roller located on the other side of the air intake opening, associated with wire or cable elastic wind-up means attached to the free edge of the shutter.

In order to ensure that the shutter is properly applied to the filter, the upstream end of the air inlet duct is equipped with a convex filter support surface, shaped for example like a section of a cylinder with an axis parallel to the axes of the supply and takeup rollers of the filter and shutter, this convex surface being formed by a number of bars against which the filter rests.

According to another embodiment, this device has a fluidtight tubular envelope connectable at both ends to two tubular elements of a ventilation system, and containing a coaxial tubular element with a smaller cross section having successively a smooth part connected to one of the envelope openings, a perforated part, and a tapered smooth part, the annular space between the tubular element and the envelope serves in the zone where the tubular element is smooth, for accommodating a tubular filter stored in folded form. The tubular filter also covers the perforated part of the tubular element and its tapered end and is associated with a traction mechanism drawing it toward a collecting bin displaced laterally relative to the tubular envelope. The annular space between the tubular element and the envelope also serves in the zone where the tubular element is perforated, to accommodate a movable shutter associated with control means designed to move the shutter so that, to a greater or the shutter covers the filter covering this perforated part of the tubular element.

In this device, which can easily be incorporated into a ventilation system in view of its shape, the air is brought to one end in the central tubular element and, at the level of the perforated zone thereof, passes through the filter into the annular space delimited on the outside by the tubular envelope air is then evacuated therefrom at the other end into the ventilation system.

According to the above-described control method, the shutter covers the filter zone to a greater or lesser degree and is unrolled in order to keep the pressure constant.

BRIEF DESCRIPTION OF THE DRAWINGS

In any event, the invention will be properly understood with the aid of the description which follows, referring to the attached schematic drawings showing, as a nonlimiting example, two embodiments of this device.

DETAILED DESCRIPTION OF PREFERRED EMBODIMENTS

Figure 1:
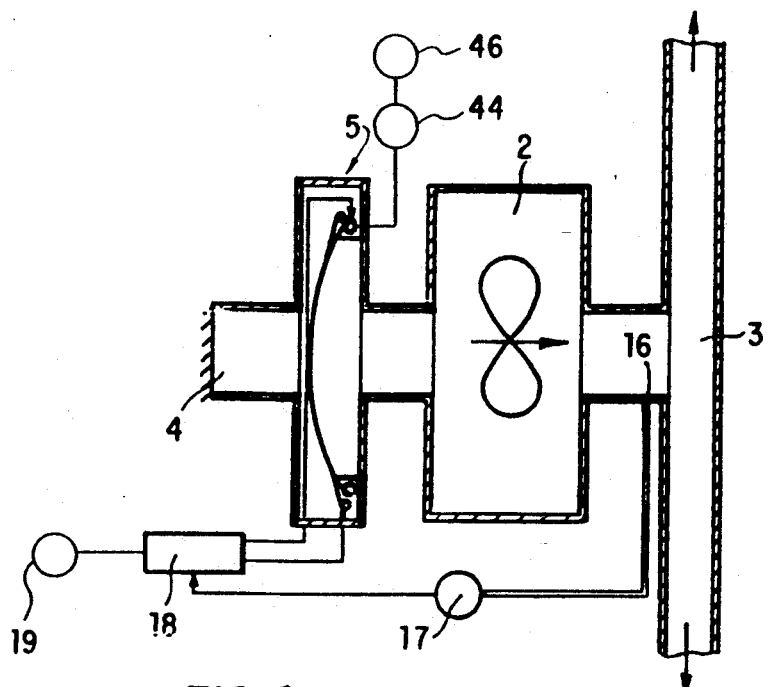
FIG. 1 is a schematic view in lengthwise section of a first embodiment of the device.

FIG. 1 shows, very schematically, a ventilation system having a fan housing 2 designed to blow air into parts of a building through pipes 3. The air comes from the outside through a pipe 4, then passes through a filtration system 5 before arriving at fan housing 2.

Figure 2:
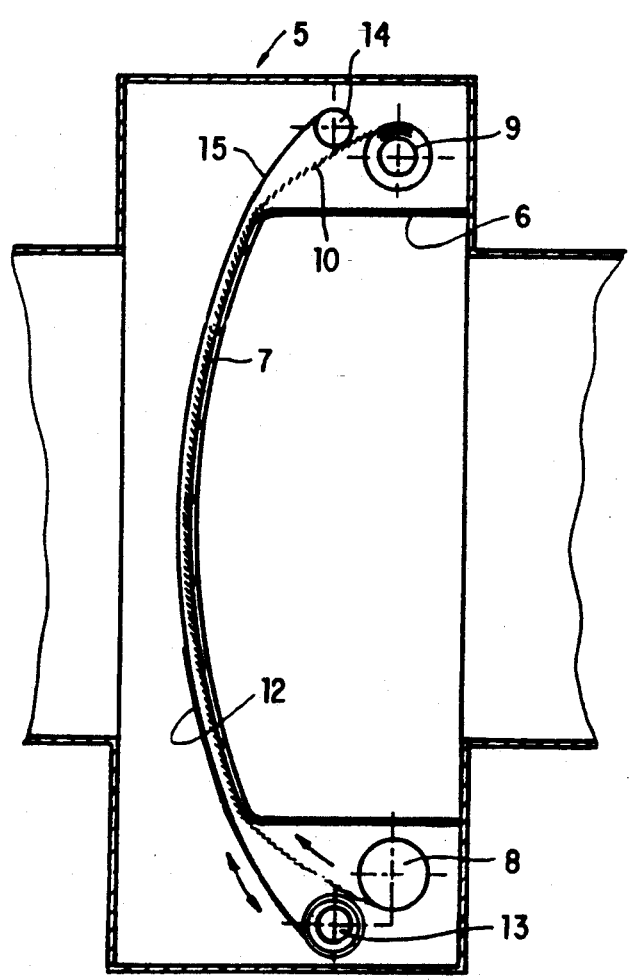
FIG. 2 is a view on an enlarged scale of the portion of the device in FIG. 1 comprising the filter and the shutter.
Figure 3:
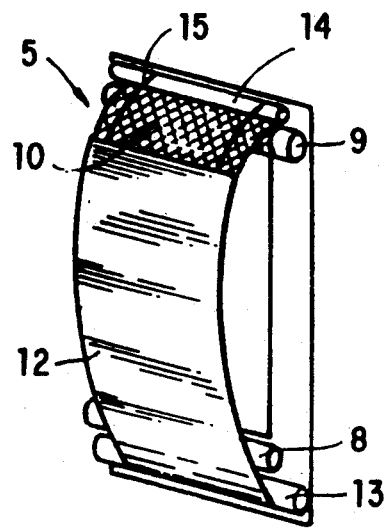
FIGS. 3 to 6 are four schematic perspective views of the filter and shutter of FIGS. 1 and 2, in four operating phases.

Filtration system 5 is shown in greater detail in FIG. 2. This figure shows a tubular element 6 located upstream of the fan, the upstream end the tubular element 6 having a plurality of bars 7 delimiting a convex section of the surface of a cylinder. On one side of pipe 6 is a braked roller 8 and on the other a motorized roller 9, intended respectively for paying out and taking up a filter 10 which permeably closes the section of pipe 6, resting on bars 7 since the axes of rollers 8 and 9 are parallel to bars 7.

Upstream of filter 10 is disposed a flexible, impermeable shutter 12 associated with two rollers, namely a motorized roller 13 and an elastic-return roller 14, roller 13 serving to pay out and take up shutter 12, while cables 15 attached to the edge of the shutter pass over elastic-return roller 14. Rollers 13 and 14 are mounted such that the shutter is always in contact with filter 10, and covers it to a greater or lesser degree depending on the amount of shutter unwound from roller 13.

As shown in FIG. 1, a pressure inlet 16 is provided downstream of fan housing 2, and a pressure sensor 17 supplies information to a logic board 18. This logic board 18 controls both the position of shutter 12 relative to filter 10 and the unwinding of filter 10 in order partially to replace it when it is too dirty.

Figure 4:
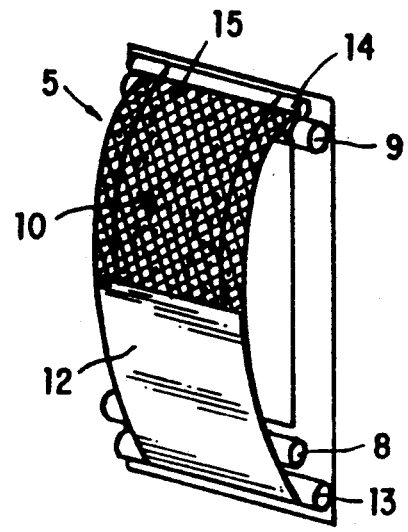
Figure 5:
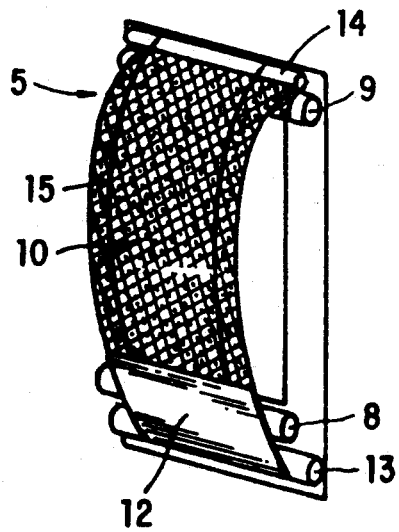
Figure 6:
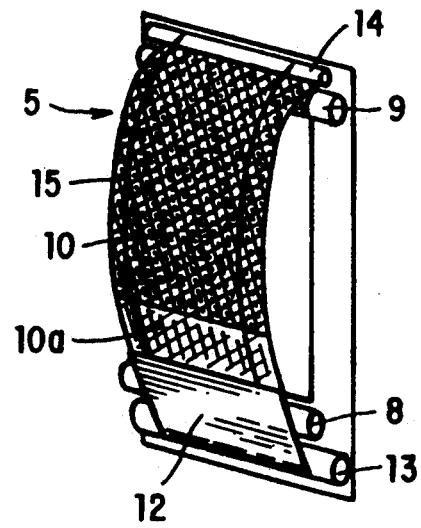

FIGS. 3 to 6 show four utilization phases of the filtration system. When the filter is new and the flow is weak, shutter 12 almost totally covers the filter. As the flow increases, in order to keep the pressure constant, a greater passage area must be provided at the filter, so that, as shown in FIG. 4, the shutter exposes a larger area of the filter than in the case of FIG. 3. The same phenomenon of filter exposure occurs when the flow does not increase and the filter becomes clogged. The logic board will then control the position of the shutter relative to the filter such that the pressure is kept essentially constant. When the filter is fully exposed, as shown in FIG. 5, and the measured pressure value is too low, the logic board gives a control signal to motorized roller 9 so that it winds a section of filter onto itself that corresponds to new filter area 10a brought to the active part. Depending on the flow, this surface 10a is sufficient, or may become too large, in which case the shutter partially covers it. If on the contrary the flow tends to increase and/or part 10a becomes dirty, a new section of filter should be advanced.

It is interesting to note that this device not only stabilizes the pressure but also optimizes filter use, as the filter is removed only when it is totally clogged.

The drawing does not show the timing device ensuring that the measured pressure is indeed stable, or the device described above which is a warning device that reacts when the pressure is not corrected after a clean length of filter of a given value has been advanced up to the filtration surface.

Figure 7:
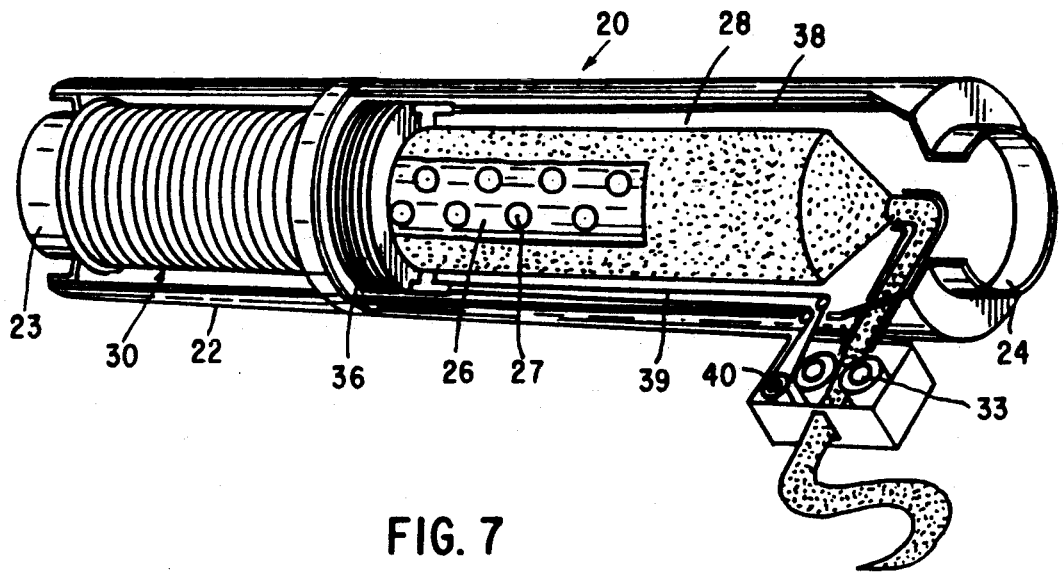
FIG. 7 is a perspective view, partially cut away, of a second embodiment of the device.
Figure 8:
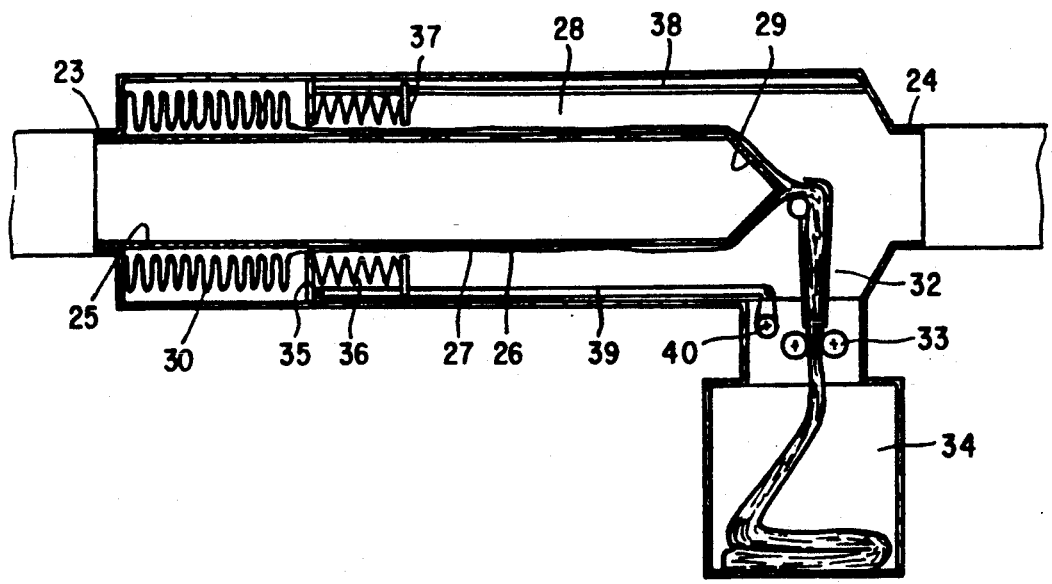
FIGS. 8 and 9 are two views in lengthwise section of the device of FIG. 7 in two operating phases.
Figure 9:
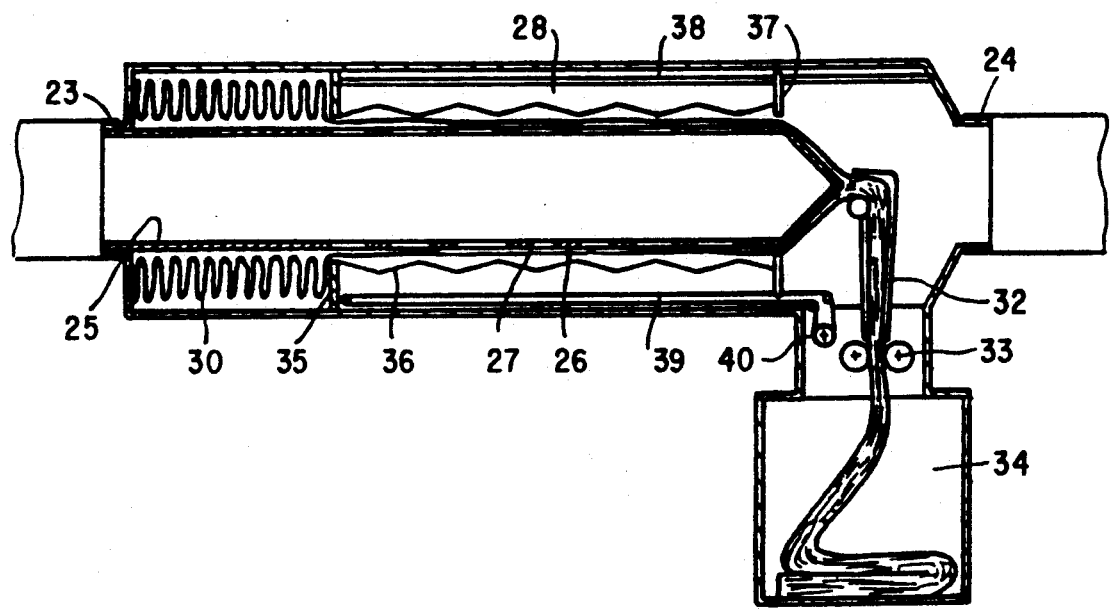

FIGS. 7 to 9 represent a second embodiment of this device. These figure show only the filtration system itself, corresponding to that marked 5 in FIG. 1, it being specified that this novel device designated by general reference 20 is designed to be inserted in the ventilation system upstream of fan 2. This filtration device is also associated with control and command elements such as those designated by numerals 16, 17, and 18 in FIG. 1.

In this case, the filtration device is in the form of a fluidtight tubular envelope 22 having two ends 23 and 24 for connection to two tubular elements belonging to the ventilation system. Inside tubular envelope 22 is mounted a coaxial tubular element which, in the embodiment shown in the drawing, is cylindrical and has a first part 25 sealed tightly to connecting end 23, this part 25 being smooth, namely delimited by a solid wall. Part 25 is extended by a perforated part 26, namely having regularly spaced openings 27 that can cause its inner volume to communicate with annular volume 28 delimited between the outer tubular envelope and tube 26. Perforated part 26 of the tube ends in a conical part 29 delimited by a solid wall. At the upper end of the filtration device, annular space 28 serves for mounting, in the form of an accordion fold, of a supply of a tubular filtration device 30. This filtration device 30 is deployed in contact with the perforated part of the tube, which it encloses, before being brought together on cone 29, and being guided inside a chute 32 and driven by two motorized rollers 33 that are caused to rotate in opposite directions, whereby the two rollers 33 move the filtration device to a collecting bin 34. Since the filtration device is stored in the form of an accordion fold, a supply of tubular filter is available corresponding substantially to 40 times the length of the filter in the deployed position.

In annular space 28, between filter storage zone 30 and the part located downstream and opposite perforated tube 26, a collar 35 is located, said collar serving to attach one end of a tubular shutter element 36, made of a fluidtight material and able to undergo accordion folding. The other end of shutter 36 is mounted on a movable collar 37 guided longitudinally on guide bars 38 and attached to an endless belt 39 associated with bidirectional drive means constituted by a pulley 40. This motorized pulley 40 is driven in one rotational direction or the other, depending on the information received from computer 18. This second embodiment of the device according to the invention operates exactly like the first embodiment, and only the respective shapes of the air passage, the filtration element, and the shutter vary. FIG. 8 represents this second device in a position in which the shutter almost completely exposes the air passage zone from the inside of tube 25, 26 to annular volume 28, while FIG. 9 represents a position in which shutter 36 is almost fully deployed and almost totally covers the filtration surface.

This device affords a great improvement to the existing technology, from the standpoint both of the performance of this device and its economical nature.

For example, when installed in an office whose occupancy fluctuates throughout the day, a filter according to the invention has twice the lifetime of a classical traveling filter, all other things being equal: filter efficiency, filtration surface, amount of dust in outside air, filter release boundaries, etc.

It goes without saying that the invention is not confined to the embodiment of this device described above as an example; on the contrary, it covers all alternative embodiments. Thus, in particular, the shutter may or may not be of the sliding type as described above, but of the rotating type for example or, in the second embodiment, the perforated tubular part may be composed of several bars delimiting a cylinder, without thereby departing from the framework of the invention.

We claim:

1. A filtration and pressure stabilization device for a variable-flow ventilation system in a housing having an air passage, comprising:
   a filter having at least a portion thereof disposed across the air passage and being coupled to a renewing mechanism in said housing for replacing at least a part of the portion of the filter disposed in the air passage;
   a movable shutter of impermeable material disposed in the air passage, located adjacent the filter;
   means for moving the movable shutter, the moving means being coupled to a control mechanism in said housing for controlling movement of the shutter across the filter; and
   a computer coupled to the renewing mechanism, the moving means and the control mechanism, responsive to fluid pressure at an outlet of the air passage, for stabilizing pressure at the outlet of the air passage by selectively moving the shutter towards a fully open position and, when the shutter is fully open, replacing at least a part of the portion of the filter disposed across the air passage.

2. A device according to claim 1, further comprising a sensor coupled to the air passage and coupled to the computer for sensing the fluid pressure or flow at the outlet of the air passage.

3. A device according to claim 1, further comprising a filter support surface coupled to the housing in the air passage and having a convex shape in the direction of air flow.

4. A device according to claim 3, wherein the filter support surface is formed of a plurality of spaced bars.

5. A device according to claim 1, wherein the renewing mechanism comprises a rotatable supply roller and a rotatable takeup roller coupled to the filter.

6. A device according to claim 5, wherein the takeup roller is motorized.

7. A device according to claim 1, wherein the control mechanism comprises a rotatable supply roller and a rotatable takeup roller coupled to the shutter, and wherein the shutter extends between the rollers in the air passage in a fully unwound position.

8. A device according to claim 7, wherein the shutter is coupled to the takeup roller by an elastic cable.

9. A device according to claim 7, wherein the supply roller is motorized.

10. A device according to claim 1, further comprising:
    a first fluid-tight tube having two ends for connection to the ventilation system, disposed coaxially in the air passage; and
    a second tube disposed coaxially within the first tube, an annular space being formed between the first and second tubes, wherein the second tube has a first solid part, a second perforated part and a third solid tapered part,
    the filter being tubular and extending in the annular space from the first solid part, over the second perforated part and over the third solid tapered part of the second tube.

11. A device according to claim 10, wherein a portion of the filter is accordion folded.

12. A device according to claim 10, wherein the renewing mechanism is a traction mechanism which draws the filter along the second tube and toward a collecting bin coupled to the housing.

13. A device according to claim 10, wherein the renewing mechanism comprises a pair of oppositely rotatable rollers through which the filter is fed.

14. A device according to claim 10, wherein the movable shutter is tubular and is arranged coaxially in the annular space around the filter adjacent the second perforated part of the second tube.

15. A device according to claim 14, wherein the control mechanism draws the shutter around the second tube, back and forth across the second perforated part.

16. A device according to claim 14, wherein the shutter is made of fluid-tight material and is accordion folded.

17. A device according to claim 14, wherein the shutter has a first end coupled to a fixed collar mounted in the annular shape and a second end coupled to a movable collar mounted on at least one longitudinal bar extending coaxially in the annular space.

18. A device according to claim 14, wherein the control mechanism comprises an endless belt having a bidirectional drive coupled to an end of the shutter.

19. A method for stabilizing filtration and pressure in a variable-flow ventilation system in an air passage, having a renewable filter and a movable shutter, comprising the steps of:
   disposing at least a portion of the filter across the air passage, the filter being coupled to a renewing mechanism;
   disposing a movable shutter of impermeable material in the air passage, the shutter being coupled to a control mechanism for controlling movement of the shutter across the filter;
   detecting fluid pressure at an outlet of the air passage;
   moving the shutter in the air passage towards a fully open position in response to the detected fluid pressure to adjust the fluid pressure; and
   replacing part of the portion of the filter in the air passage in response to the detected fluid pressure to adjust the fluid pressure when the shutter is fully open.

* * * * *